US009618121B2

(12) United States Patent
Tripathy et al.

(10) Patent No.: US 9,618,121 B2
(45) Date of Patent: Apr. 11, 2017

(54) METAL GASKET

(71) Applicant: Federal-Mogul Corporation, Southfield, MI (US)

(72) Inventors: Bhawani Tripathy, Ann Arbor, MI (US); Thomas O. Zurfluh, Evanston, IL (US)

(73) Assignee: Federal-Mogul Corporation, Southfield, MI (US)

( * ) Notice: Subject to any disclaimer, the term of this patent is extended or adjusted under 35 U.S.C. 154(b) by 613 days.

(21) Appl. No.: 13/925,038

(22) Filed: Jun. 24, 2013

(65) Prior Publication Data

US 2013/0283883 A1 Oct. 31, 2013

Related U.S. Application Data

(62) Division of application No. 12/045,215, filed on Mar. 10, 2008, now Pat. No. 8,470,098.

(60) Provisional application No. 60/894,078, filed on Mar. 9, 2007.

(51) Int. Cl.
*F16J 15/08* (2006.01)

(52) U.S. Cl.
CPC ....... *F16J 15/0806* (2013.01); *F16J 15/0818* (2013.01)

(58) Field of Classification Search
CPC ............................. F15J 15/0818; C22C 38/00
USPC ........................................................ 148/325
See application file for complete search history.

(56) References Cited

U.S. PATENT DOCUMENTS

| 6,352,670 | B1 | 3/2002 | Rakowski |
| 6,610,771 | B1 | 8/2003 | Hoyes et al. |
| 7,135,519 | B2 * | 11/2006 | Atkinson .............. C04B 14/204 277/591 |
| 2004/0121169 | A1 | 6/2004 | Adachi et al. |
| 2004/0156737 | A1 | 8/2004 | Rakowski |
| 2005/0209386 | A1 | 9/2005 | Atkinson et al. |
| 2009/0263269 | A1 | 10/2009 | Murakami et al. |

(Continued)

FOREIGN PATENT DOCUMENTS

| DE | 3633988 A1 | 4/1987 |
| EP | 1118687 A1 | 7/2001 |

(Continued)

OTHER PUBLICATIONS

Machine translation of JP2006079314A, Mar. 2006.*
Supplemental Partial European Search Report, mailed Apr. 21, 2015 (EP07812737).

*Primary Examiner* — Jie Yang
(74) *Attorney, Agent, or Firm* — Robert L. Stearns; Dickinson Wright, PLLC

(57) ABSTRACT

A metal gasket includes embossments that exhibit essentially full functional recovery and full retained internal stress at temperatures up to about 1000° F. which is made from sheet material that is cold rolled and whose embossments are work hardened without any post embossment heat treating that would act to harden the material. This material may also receive a precipitation hardening heat treatment prior to being embossed. The gasket materials include alloys having greater than about 18% Ni, greater than about 14% Cr, from about 0.1 to 10% of at least one of Mo, Ti, V, Al, Co, Nb, Ta or Cu and the balance Fe with incidental impurities, which are cold rolled without any post embossment heat treating that would act to harden the material.

12 Claims, 6 Drawing Sheets

(56) References Cited

U.S. PATENT DOCUMENTS

2010/0154939 A1  6/2010  Murakami et al.

FOREIGN PATENT DOCUMENTS

| EP | 1429057 A1 | 6/2004 |
|---|---|---|
| GB | 2283248 | 5/1995 |
| JP | H05179379 A | 7/1993 |
| JP | 7188818 A | 7/1995 |
| JP | 7331368 A | 12/1995 |
| JP | 10265878 A | 10/1998 |
| JP | 2001012609 A | 1/2001 |
| JP | 2002235134 A | 8/2002 |
| JP | 2004507616 A | 3/2004 |
| JP | 2006070314 A | 3/2006 |
| JP | 2006200837 A | 8/2006 |
| JP | 2008208451 A | 9/2008 |
| KR | 1020040015193 A | 2/2004 |
| WO | 02088410 A1 | 11/2002 |

* cited by examiner

METAL GASKET

CROSS-REFERENCES TO RELATED APPLICATIONS

This divisional patent application claims priority to US Provisional Patent Application Ser. No. 60/894,078 filed Mar. 9, 2007, and U.S. Utility patent application Ser. No. 12/045215, filed Mar. 10, 2008 which are both incorporated herein by reference in their entirety.

BACKGROUND OF THE INVENTION

1. Technical Field

This invention relates generally to metal gaskets. More particularly, it relates to embossed metal gaskets made from high temperature alloys. Even more particularly, to embossed metal gaskets made from high temperature iron-nickel-chromium alloys operative at temperatures up to about 1000° F.

2. Related Art

It is well known to use embossed metal for moderate to high temperature gaskets of internal combustion engines, including both gasoline and diesel fueled engines. For example, 301 stainless steel gaskets fully hardened by cold reduction (301 FH SS) perform acceptably up to about 800° F., but loses its strength at temperatures above about 1000° F. where the embossments take a heat set and fail to fully recover to their operational sealing state in use, thereby losing their ability to effectively seal a joint. However, even at operating temperatures below 1000° F., the performance of 301 FH SS and other stainless steels such as 309 FH CR and 316Ti diminishes proportionately with increasing temperature, from room temperature up to about 1000° F., and generally at an increasing rate above 800° F., as illustrated in FIG. 3 which illustrates the recovered embossment height as a function of temperature. This stress relaxation is important because this gradual decrease in the properties, even at moderate temperatures from about 230-550° F., for a given gasket design may cause the gasket loading to be reduced to the point that sealing is compromised. Frequently, such a decrease in properties is addressed in the gasket design by the incorporation of additional gasket layers to obtain the required gasket height and sealing properties. This temperature effect and limitation of gaskets that are subject to it is exacerbated in sealing applications where the joint to be sealed experiences large thermal or dynamic mechanical movement, such as in joints that are exposed to vibration, particularly those which also experience large temperature variations. This is frequently the case in many joints where a flanged member is attached to a mating joint member, particularly another flanged joint member. In sealing applications associated with internal combustion engines, examples include joints for certain head gasket configurations, exhaust downpipe clamps, intake manifolds and turbocharger intercoolers.

SUMMARY OF THE INVENTION

The present invention provides a cost effective solution to the problem of providing a commercially suitable material for moderate to high temperature embossed metal gasket applications up to operating temperatures of about 1000° F.

In one aspect of the invention, a metal gasket is provided that includes embossments that exhibit essentially full functional recovery and retained stress at operating temperatures up to about 1000° F. and which is made from metal sheet material that is cold-rolled and whose embossments are work hardened and at full operational strength without any post embossment heat treating that would act to harden the material.

According to another aspect of the invention, the gaskets are made of precipitation hardenable iron-nickel-chromium alloys which are first hardened through cold rolling, precipitation hardened by a precipitation hardening heat treatment and then embossed to form and work harden the embossments, after which there is no post-embossment heat treatment that would act to harden the material.

According to a further aspect of the invention, any iron-nickel-chromium alloy that responds to the cold roll/work harden embossment processing without post-embossment heat treating that would act to further harden the material is contemplated for use in making a gasket of this type.

According to a further aspect of the invention, any alloy that responds to cold roll work hardening followed by coil form precipitation hardening and then embossment processing without post-embossment heat treating that would act to further harden the material is contemplated for use in making a gasket of this type.

According to a further aspect of the invention, a gasket sheet having at least one embossed sealing bead made from an alloy including, by weight: >18% Ni, >14% Chrome; 0.1-10% of at least one element selected from the group consisting of Mo, Ti, V, Al, Co, Nb, Ta and Cu; and the balance substantially Fe with the gasket sheet having a deformed work hardened microstructure is contemplated for use as a gasket of the invention, According to a further aspect of the invention, a gasket sheet having at least one embossed sealing bead made from an iron-nickel-chromium alloy including, by weight: 18-28% Ni; 18-23% Cr; 0-8% Mo; 0-1.5% Cu; 0-1% Si; 0-3% Mn; 0-0.6% Ti; 0-0.6% Al; 0-0.08% C; 0-0.015% S; 0-0.03% P; 0-0.4% N; and the balance substantially Fe, is contemplated for use as a gasket of the invention.

According to a further aspect of the invention, a gasket sheet having iron-nickel-chromium alloy which includes, by weight: 24-55% Ni; 13.5-21% Cr; 1-3.3% Mo; 0-0.15% Cu; 0-1% Si; 0-2% Mn; 0.65-2.3% Ti; 0-0.8% Al; 0-0.5% V; 0.001-0.01% B; 0-1% Co; 0-5.5% of the sum of Nb or Ta; 0-0.08% C; 0-0.015% S; 0-0.015% P; and the balance substantially Fe is contemplated for use as a gasket of the invention.

According to a further aspect of the invention, the invention includes a method of making an embossed metal gasket including the steps of: forming an annealed sheet of an iron-nickel-chromium alloy; deforming said annealed sheet to form a deformed sheet having a deformed microstructure; and forming a gasket from said deformed sheet having at least one embossed sealing bead, said embossed sealing bead sealably operable with substantially full functional recovery and retained stress in a fully-clamped sealed joint at a temperature up to about 1000° F.

According to a further aspect of the invention, iron-nickel-chromium alloy gasket sheets of the invention may be coated with a heat resistant coating. The heat resistant coating may include chemically exfoliated vermiculite, a high temperature organic resin, a supplementary inorganic resin and a flaky filler.

According to another aspect of the invention, the embossments may include full embossments or partial embossments, including at least half embossments.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 2:
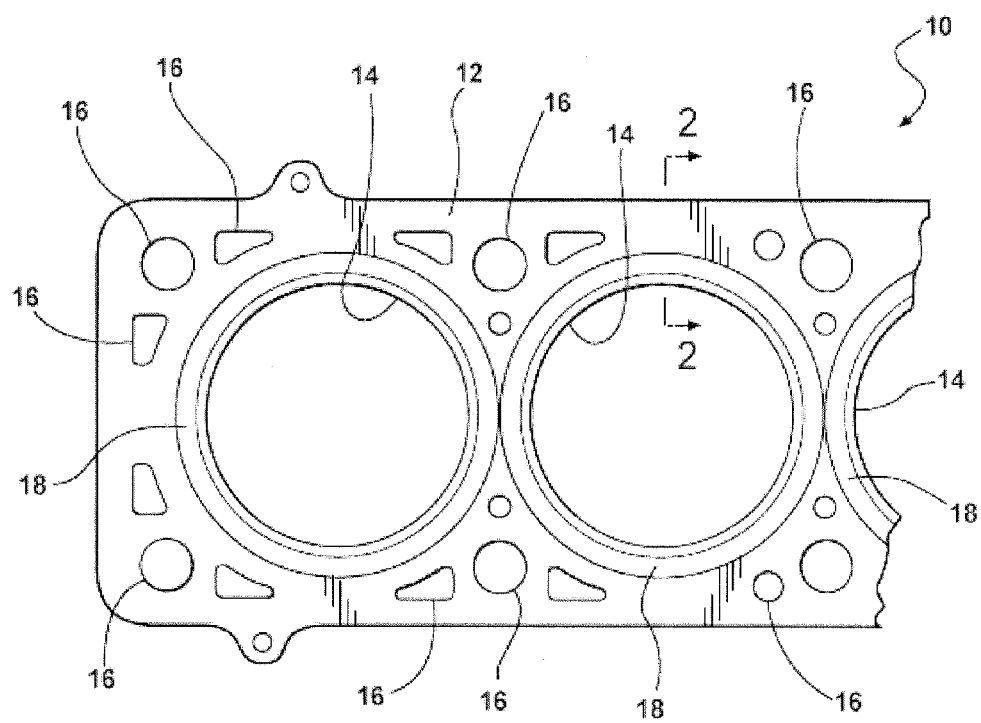
FIG. 2 is a plan view of a gasket constructed according to one exemplary embodiment of the invention.
Figure 3:
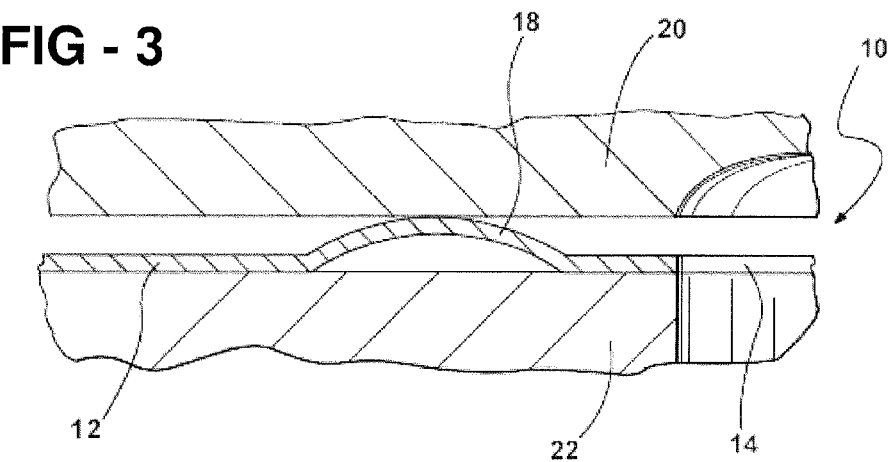
FIG. 3 is an enlarged fragmentary cross-sectional view of a portion of the gasket of FIG. 2 in a joint.

FIGS. 2 and 3 illustrate single layer a metal gasket 10 constructed according to an exemplary embodiment of the present invention. Both single and multi-layer embossed metal gaskets are contemplated and are to be included within the scope of the invention. The embossments may include full height embossments or partial height embossments, including at least half height embossments The gasket 10 includes at least one metal layer 12. The layer 12 is fabricated of metal sheet material that has been stamped or otherwise formed to include at least one fluid conveying opening 14. However, as will readily be appreciated, gasket 10 may include any number of fluid conveying openings, and many embodiments will include a plurality of such openings. The layer 12 may also include additional openings 16 to receive fasteners or other clamping devices (not shown) which may be used to clamp the gasket 10 between a first member 20 and a second member 22, such as an exhaust manifold (not shown) and an engine block (not shown) to be sealed by the gasket 10 thereby forming a sealed joint. First joint member 20 and second joint member 22 and gasket 10 are shown in FIG. 3 in an unclamped state with the components in their respective locations just prior to clamping.

The at least one metal layer 12 may be fabricated from a suitable iron-nickel-chromium alloy, including certain precipitation hardenable alloys. The metal sheet material of the selected iron-nickel-chromium alloy is cold rolled to work harden the material in order to develop a tensile strength in the range of at least 1000 MPa measured at room temperature and an elongation that is as large as possible and at least 5%, and more particularly 5-25%, and even more particularly 5-10%, and most particularly 6-9%. The metal sheet material must have sufficient ductility and elongation to permit a desired gasket form to be excised from a sheet or roll and processed to form the necessary openings and embossments as described herein, or vice versa, by various combinations of rolling, stamping, pressing and other known processing methods for forming embossed gaskets without cracking the material and while also imparting sufficient tensile strength to function as a gasket and maintain adequate strength at high temperatures up to about 1000° F. so that it continues to provide a seal to the joint in which it is installed under high temperature operating conditions. When the metal sheet material comprises precipitation hardenable iron-nickel-chromium alloy, the material may also be precipitation hardened following cold rolling to further enhance the high temperature properties of the gasket 10 using a suitable precipitation hardening heat treatment.

Following cold rolling and any precipitation hardening heat treatment, the sheet material can be blanked into gaskets to form the various openings mentioned above. During the blanking operation, or in a separate operation either before or after blanking, the blanks can be embossed to produce at least one seal embossment or bead 18 surrounding at least one of the openings 14. The embossment 18 may be a full embossment, typically a circular arc or other curved portion, or a half embossment where a portion of the surface of the sheet is raised with respect to other portions, typically through the use of a series of complementary radii or circular arcs or other curved portions. This embossment 18 comprises a spring member incorporated into the gasket sheet which applies a force against the surface of the respective joint members 20,22 sufficient to seal a fluid opening. The cold work and deformation imparted during the embossment step does not add any significant additional strength to the metal sheet in the portion thereof which includes embossment 18, although the invention does not preclude deformation sufficient to provide additional mechanical strength to the sheet material, particularly in the region proximate the embossment, in this step. Gaskets 10 made from the preferred cold-rolled iron-nickel-chromium alloy materials will have sealing beads 18 that, when clamped under operational loads at operational temperatures up to about 1000° F. for the operational life of the gasket will maintain resiliency sufficient to provide an adequate sealing stress on the surfaces of the sealed joint so as to maintain an adequate seal. This aspect of the gaskets 10 of the present invention can be tested by clamping the gasket under operating conditions for an extended period of time under temperature, joint load, environmental and other conditions representative of what the gasket 10 would see for a given engine application over the life of the gasket, or the conditions required to meet engine qualification standards, and namely temperatures up to about 1000° F. In particular, they will not experience an unacceptable reduction in recovered gasket height when exposed to operating conditions below about 1000° F. In many cases they will exhibit little or no appreciable reduction in the recovered gasket height as shown by the alloys illustrated in FIGS. 4 and 5, but will in any case have a recovered gasket height greater than 0.0025 inches under these operating conditions, particularly when tested as described herein. This improvement in recovered gasket height is indicative that these alloys have greater amounts of retained stress, essentially full retained stress, in the gasket, particularly the embossments, due to improved creep resistance characteristics in this temperature regime than is obtainable in prior art gasket materials, including 301 FH, 309 FH CR and 316Ti stainless steels.

Figure 1:
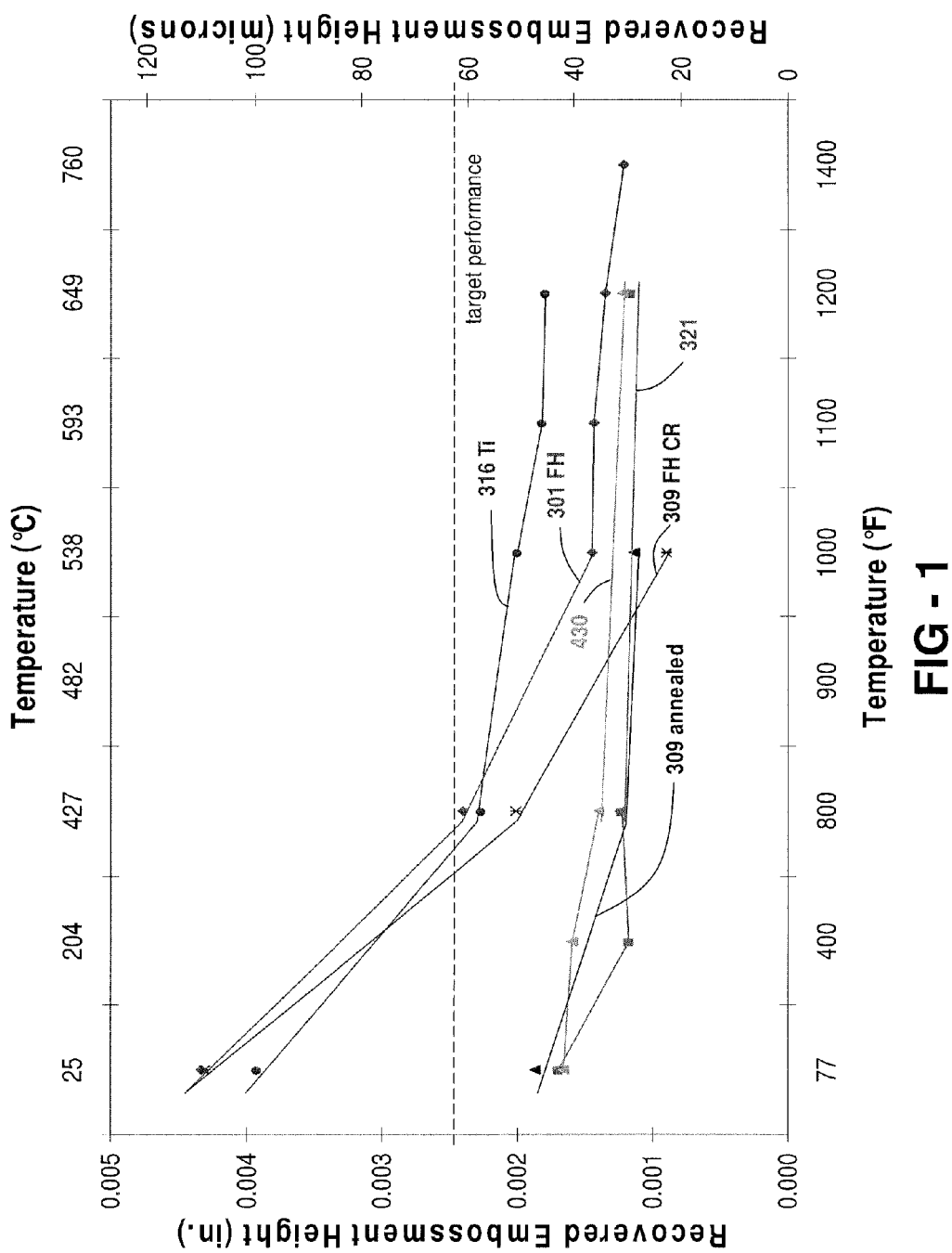
FIG. 1 is a graph of the recovered embossed height as a function of temperature for several prior art metal gasket alloys subjected to a clamp test.
Figure 4:
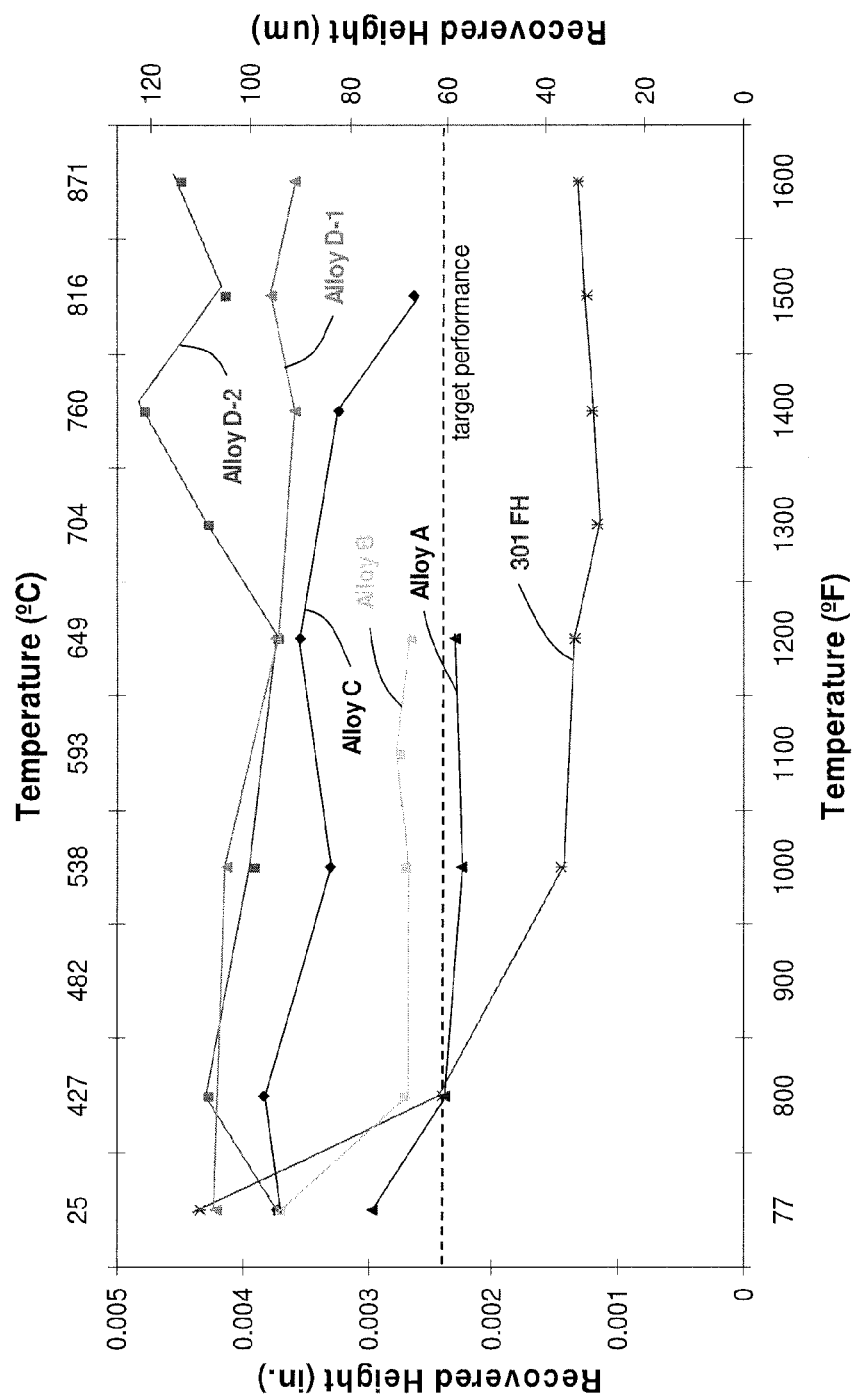
FIG. 4 is a graph of the recovered embossed height as a function of temperature for several alloys of the invention subjected to a clamp test.
Figure 5:
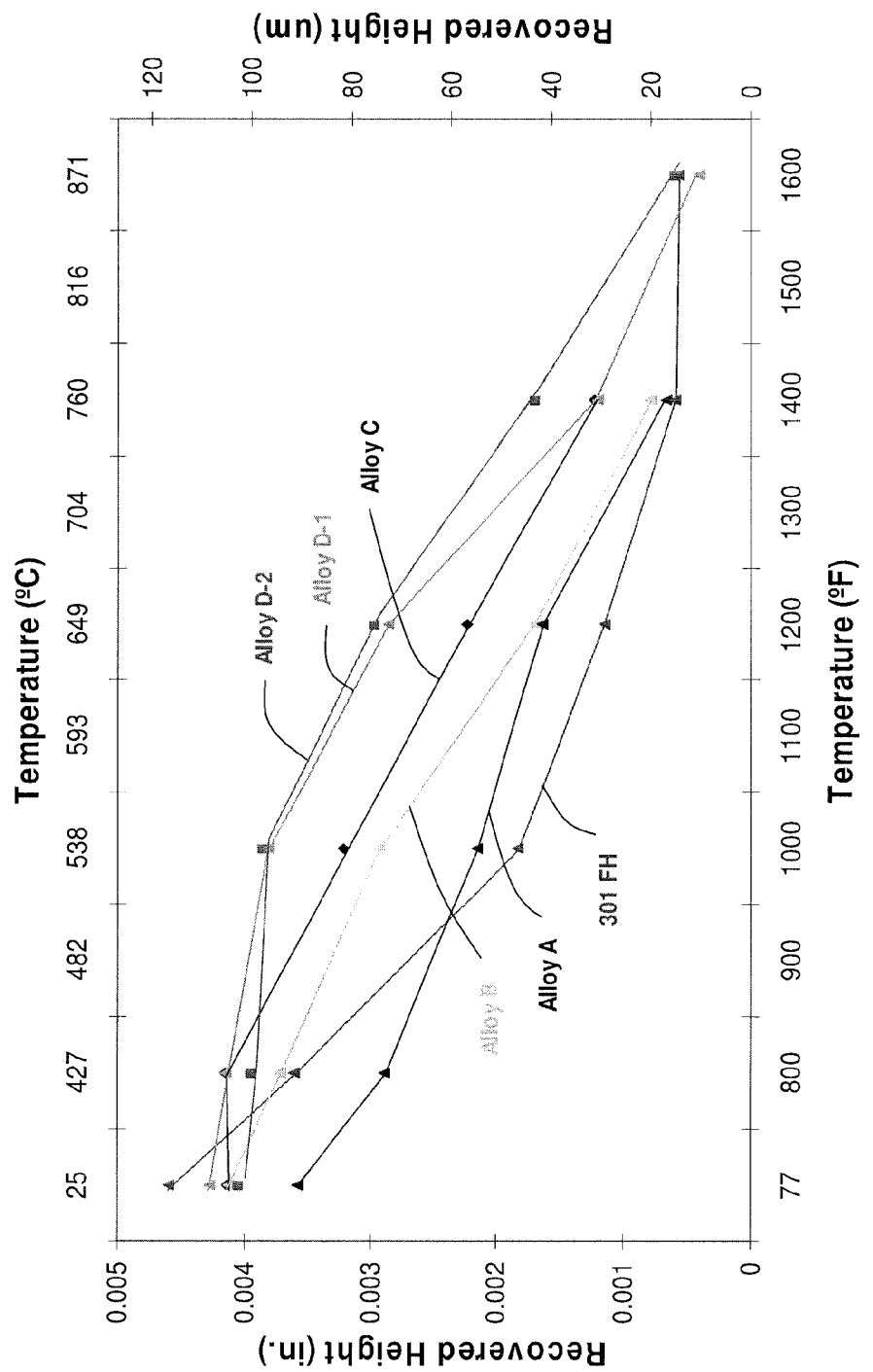
FIG. 5 is a graph of the recovered embossed height as a function of temperature for several alloys of the invention subjected to a constant load clamp test.

The recovered gasket height can be tested by clamping the gasket under operating conditions, including thermal cycling, for an extended period of time representative of what the gasket would see for a given engine application over the life of the gasket or under conditions are required to meet engine qualification standards, and namely temperatures up to about 1000° F. An embossed gasket loaded under these conditions should maintain its ability to seal at the embossments throughout the expected life of the gasket. Those skilled in the art of hot gasket design, development, manufacture and testing will appreciate that there may be a number of methods and apparatuses to measure bead set, with all having in common the desire to test whether a gasket is able to survive under given conditions without failure, such as by taking a heat set such that the gasket either does not maintain or recover to its original embossed height, or loses strength such that when clamped it does not develop a sufficient load to seal the desired fluid conveying passageway. The test itself is not important, but rather the ability of the gasket to perform under real operating conditions where the gasket will see temperatures up to about 1000° F. One test that is suitable involves preparing a test washer of a suitable cold rolled metal sheet material having an opening and a full embossment, representative of embossment or sealing bead 18, surrounding the opening. The washer has an OD of 2.75 inches, and ID of 1.75 inches and a material thickness, T, of about 0.010 inches. The starting bead height is 1.5T, or 0.015 inches above the top surface of the body of the metal layer. The washer is clamped between two 1 inch thick platens with a grade 5 bolt under a joint load of 1000 PLI (Pounds per Linear Inch) and then heated at a temperature representative of an engine operating temperature for 17 hours, removed and the height of the bead above body remeasured. It is an accepted industry standard that a minimum recovered bead height of 0.0025 inches over the top surface of the body is acceptable to maintain an adequate seal for the life of the gasket at the measured test temperature, and corresponds to an essentially full functional or operational recovery of the bead and essentially full retained stress in the gasket, particularly the embossments. At a minimum these alloy all retained greater stress than prior art gasket alloys from room temperature up to about 1000° F. Test washers of the types described above made of the four alloys precipitation hardenable high temperature alloys shown in Table 1 below were tested at temperatures of 800° F., 1000° F., 1400° F., 1500° F. and 1600° F. as shown in FIGS. 4 and 5 and were all found to fall within the acceptable standard of bead recovery, with the final bead height of all samples being at least 0.0025 inches over body. In particular, they exhibited no unacceptable decrease in recovered height and essentially full retained stress for operating temperatures under 1000° F., in contrast to the prior art alloys shown in FIG. 1.

It is believed that some of the suitable iron-nickel-chromium alloys of the invention which may be precipitation hardenable may also benefit from a combination of cold working and precipitation hardening. As such, the invention contemplates that after the cold rolling step, the sheet material may also be given a precipitation hardening heat treatment in coil form to develop the desired strength and elongation properties mentioned. Those skilled in the art of material selection and heat treating will understand without undue experimentation or invention that, depending upon the particular composition of the alloy and the desired end properties to be achieved, a precipitation hardening heat treat cycle can be carried out to achieve the desired end result. For example, some of the precipitation hardenable alloys contemplated by the present invention and described in more detail below may benefit from a precipitation hardening heat treat cycle following cold rolling, generally at temperatures above 1000° F. for about 8-15 hrs. Suitable precipitation hardenable alloy compositions are high nickel, high chromium alloys with additions to facilitate precipitation hardening, such as are also described further herein.

TABLE 1

| Element | 301 FH (comparative) wt % | Alloy A wt % | Alloy B wt % | Alloy C wt % | Alloy D wt % |
| --- | --- | --- | --- | --- | --- |
| C | 0.03-0.15 | 0.08 mx | 0.020 mx | 0.08 mx | 0.08 mx |
| Mn | 2.00 mx | 1.00 mx | 3.00 mx | 2.00 mx | 0.35 mx |
| S | 0.030 mx | 0.015 mx | 0.01 mx | | 0.015 mx |
| P | 0.045 mx | | 0.03 mx | | 0.015 mx |
| Si | 1.00 mx | 1.00 mx | 0.05 mx | 1.00 mx | 0.35 mx |
| Cr | 16.00-18.00 | 18-22 | 20.5-23.0 | 13.5-16.00 | 17.00-21.00 |
| Ni | 6.00-8.00 | 18-22 | 26.0-28.0 | 24.00-27.00 | 50.00-55.00* |
| Mo | 0.80 mx | | 6.50-8.00 | 1.00-1.50 | 2.80-3.30 |
| N | 0.09 mx | | 0.30-0.40 | | |
| Ti | | 0.60 mx | | 1.90-2.30 | 0.65-1.15 |
| V | | | | 0.10-0.50 | |
| Al | | 0.60 mx | | 0.35 mx | 0.35-0.80 |
| B | | | | 0.003-0.010 | 0.001-0.006 |
| Co | | | | | 1.00 mx |
| Nb + Ta | | | | | 4.75-5.50 |
| Cu | | 0.75 mx | 0.50-1.50 | | 0.15 mx |
| Fe | bal | bal | bal | bal | bal |

While not intending to be limited, the compositions of the desired alloys may be in the range, in weight percent, of >18%Ni, >14% Cr, from 0.1 to 10% of at least one of Mo, Ti, V, Al, Co, Nb, Ta or Cu and the balance Fe with incidental impurities allowed as well as other additions that do not detract from the desired properties. Specific examples of suitable alloys of the invention within the above range include Alloys A-D summarized in Table 1 and described below.

Alloy A may be described as including, by weight: 18-22% Ni; 18-22% Cr; 0-0.75% Cu; 0-1% Si; 0-1% Mn; 0-0.6% Ti; 0-0.6% Al; 0-0.08% C; 0-0.015% S; and the balance substantially Fe. As described above, Alloy A may also include other alloying additions so long as the resultant alloy has mechanical properties consistent with manufacture and installation of the gasket and substantially full recovery of the gasket height and essentially full retained stress at temperatures up to about 1000° F. As may be seen in FIG. 4, the recovered height of Alloy A was slightly below 0.0025 inches over the surface of the gasket at temperatures up to about 1000° F.; however, as may be seen from FIG. 1 and FIG. 4, this performance was better than either 301FH or 316Ti, and at higher temperatures, including temperatures exceeding about 1100° F., the performance improvement was even greater. Thus, in view of the stability of the performance of Alloy A and the demonstrated improvement over the performance of 301FH and 316Ti, Alloy A exhibits substantially full functional recovery and essentially full retained stress at temperatures up to about 1000° F. Alloy A is not believed to be a precipitation hardenable alloy, although some precipitation hardening may occur if subjected to a precipitation hardening heat treatment as described herein. Thus, while not precluded, it is preferred that sheet materials of Alloy A be processed as described herein by cold rolling to impart the desired cold work without receiving a precipitation hardening heat treatment.

Alloy B may be described as including, by weight: 26-28% Ni; 20.5-23.0% Cr; 6.5-8% Mo; 0.5-1.5% Cu; 0-0.05% Si; 0-3% Mn; 0-0.020% C; 0-0.01% S; 0-0.03% P; 0.3-0.4% N; and the balance substantially Fe. As described above, Alloy B may also include other alloying additions so long as the resultant alloy has mechanical properties consistent with manufacture and installation of the gasket and substantially full recovery of the gasket height and essentially full retained stress at temperatures up to about 1000° F. As may be seen in FIG. 4, the recovered height of Alloy B was above .0025 inches over the surface of the gasket at temperatures up to about 1000° F. Thus, Alloy B exhibits full functional recovery and essentially full retained stress at temperatures up to about 1000° F. Alloy B is not believed to be a precipitation hardenable alloy, although some precipitation hardening may occur if subjected to a precipitation hardening heat treatment as described herein. Thus, while not precluded, it is preferred that sheet materials of Alloy B be processed as described herein by cold rolling to impart the desired cold work without receiving a precipitation hardening heat treatment.

It is believed that Alloys A and B are representative of a number of other non-precipitation hardenable iron-nickel-chromium alloys that may be described generally as those having, by weight, >18%Ni, >14% Cr, from 0.1 to 10% of at least one of Mo, Ti, V, Al, Co, Nb, Ta or Cu and the balance Fe and incidental impurities, and more particularly as those falling within the constituent ranges of these alloys and having, by weight: 18-28% Ni; 18-23% Cr; 0-8% Mo; 0-1.5% Cu; 0-1% Si; 0-3% Mn; 0-0.6% Ti; 0-0.6% Al; 0-0.08% C; 0-0.015% S; 0-0.03% P; 0-0.4% N; and the balance substantially Fe. It is believed that these alloys will exhibit at least substantially full functional recovery and essentially full retained stress at temperatures up to about 1000° F. These alloys are generally not believed to be precipitation hardenable alloys, although some precipitation hardening may occur if subjected to a precipitation hardening heat treatment as described herein. Thus, while not precluded, it is preferred that sheet materials of these alloys be processed as described herein by cold rolling to impart the desired cold work without receiving a precipitation hardening heat treatment.

Alloy C may be described as including, by weight: 24-27% Ni; 13.5-16% Cr; 1-1.5% Mo; 0-1% Si; 0-2% Mn; 0-0.08% C; 1.9-2.3% Ti; 0.1-0.5 V; 0-0.35% Al; 0.003-0.01% B; and the balance substantially Fe. As described above, Alloy C may also include other alloying additions so long as the resultant alloy has mechanical properties consistent with manufacture and installation of the gasket and substantially full recovery of the gasket height and essentially full retained stress at temperatures up to about 1000° F. As may be seen in FIG. 4, the recovered height of Alloy C was substantially above .0025 inches over the surface of the gasket at temperatures above 1000° F. Thus, Alloy C also exhibits full functional recovery and essentially full retained stress at temperatures up to about 1000° F. Alloy C is a precipitation hardenable alloy. Thus, while cold rolling alone is not precluded, it is preferred that sheet materials of Alloy C be processed as described herein by cold rolling to impart the desired cold work followed by an additional precipitation hardening heat treatment as described herein prior to the forming of embossments. This heat treatment imparts greater strength to these alloys and more than offsets any reduction of the cold work and associated strength increase imparted by cold rolling, as such alloys evidence a cold worked microstructure following the precipitation hardening heat treatment.

Alloy D is illustrated in FIG. 4 by Alloy D-1 and Alloy D-2 which represented different heats of this material. Alloy D may be described as including, by weight, 50-55% Ni; 17-21% Cr; 2.8-3.3% Mo; 0-0.15% Cu; 0-0.35% Si; 0-0.35% Mn; 0.65-1.15% Ti; 0.35-0.8% Al; 0.001-0.006% B; 0-1% Co; 4.75-5.5% of the sum of Nb or Ta; 0-0.08% C; 0-0.015% S; 0-0.015% P; and the balance substantially Fe,. As described above, Alloy D may also include other alloying additions so long as the resultant alloy has mechanical properties consistent with manufacture and installation of the gasket and substantially full functional recovery and essentially full retained stress at temperatures up to about 1000° F. As may be seen in FIG. 4, the recovered height of Alloy D was substantially above .0025 inches over the surface of the gasket at temperatures up to about 1000° F. Thus, Alloy D also exhibits full functional recovery and essentially full retained stress at temperatures up to about 1000° F. Alloy D is a precipitation hardenable alloy. Thus, while cold rolling alone is not precluded, it is preferred that sheet materials of Alloy D be processed as described herein by cold rolling to impart the desired cold work followed by an additional precipitation hardening heat treatment as described herein prior to the forming of embossments.

It is believed that Alloys C and D are representative of a number of other precipitation hardenable iron-nickel-chromium alloys that may be described generally as those having, by weight, >18%Ni, >14% Cr, from 0.1 to 10% of at least one of Mo, Ti, V, Al, Co, Nb, Ta or Cu and the balance Fe and incidental impurities, and more particularly as those falling within the constituent ranges of these alloys and having, by weight: 24-55% Ni; 13.5-21% Cr; 1-3.3% Mo; 0-.15% Cu; 0-1% Si; 0-2% Mn; 0.65-2.3% Ti; 0-0.8% Al; 0-.5% V; 0.001-0.01% B; 0-1% Co; 0-5.5% of the sum of Nb or Ta; 0-0.08% C; 0-0.015% S; 0-0.015% P; and the balance substantially Fe. It is believed that these alloys will exhibit full functional recovery and essentially full retained stress at temperatures up to about 1000° F. These alloys are generally believed to be precipitation hardenable alloys, although the effectiveness of precipitation hardening may vary over the range of alloy compositions described above. Thus, while cold rolling alone is not precluded, it is preferred that sheet materials of Alloy D be processed as described herein by cold rolling to impart the desired cold work followed by an additional precipitation hardening heat treatment as described herein prior to the forming of embossments.

FIG. 5 provides additional evidence of the full functional recovery exhibited by iron-nickel-chromium alloy gaskets of the invention. Test specimens of Alloys A-D as described above were subjected to a high-temperature, constant-load test where they were held at the temperatures shown in a test fixture that was adapted to maintain a constant load similar to the initial load of the fixture described above. Due to the constant load aspects, this is a more severe test of the recovery characteristics of the alloys of the invention than that described above and reported in FIG. 5. As may be seen, the alloys also exhibited full functional recovery and essentially full retained stress at temperatures up to about 1000° F. under the more severe test conditions.

Figure 6:
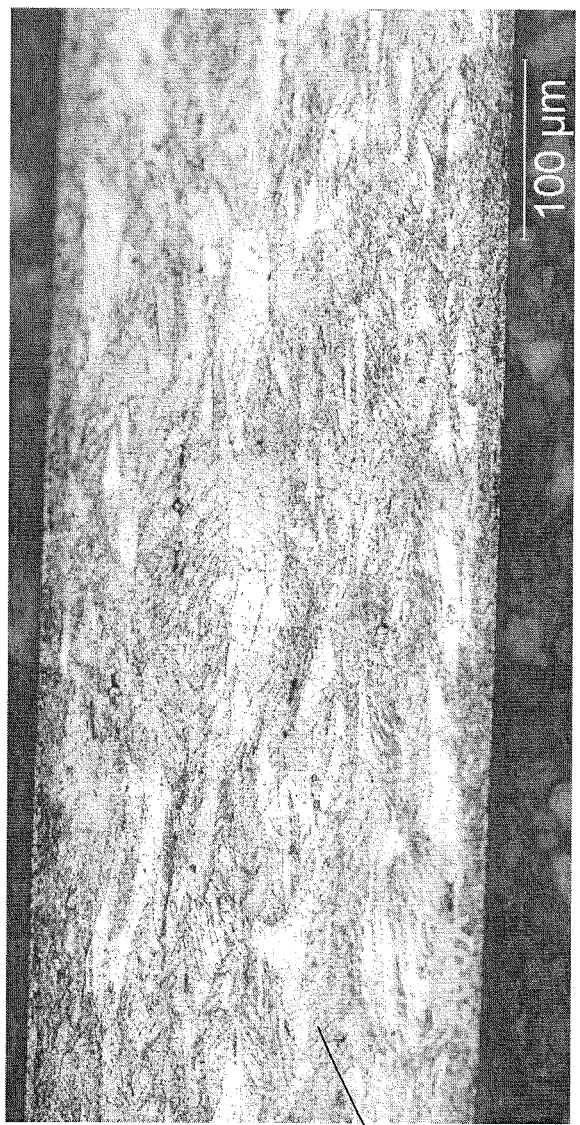
FIG. 6 is a photomicrograph of the microstructure of a cross-sectional sample of a gasket sheet of the invention taken at a magnification of 200x.

The seal beads or embossments 18, as a result of the cold rolling and embossing, are work hardened which is evidenced by the directional grain structure of the metal sheet beads as compared to the pre-cold rolled and embossed state of the material as illustrated generally in FIG. 6. While the microstructures of alloys of the invention may vary as to the degree of cold work evidenced in the microstructure, such as by those alloys that have been precipitation hardened following cold working exhibiting less directional grain structure than those that are not precipitation hardened. Nonetheless, alloys of the invention should exhibit microstructural evidence of residual cold work and a lack of post-embossment heat treating.

Once the beads 18 are formed, it is preferred that the at least one metal layer 12 is not heat treated or further processed, but particularly in a manner that would serve to further harden the beads 18, such as by performing any additional precipitation hardening heat treatments. Regardless, any post-embossment heat treatment or other processing of gasket 10 is performed under conditions so as to retain at least a portion of the cold work or precipitation hardening or both described above, consistent with maintenance of the tensile strength, ductility and high temperature recovery performance described herein. In other words, the beads 18 derive their final strength and hardness at the time the beads are formed and nothing is done to alter them or to strengthen them further once they are formed, including post-embossment heat treating.

Figure 7:
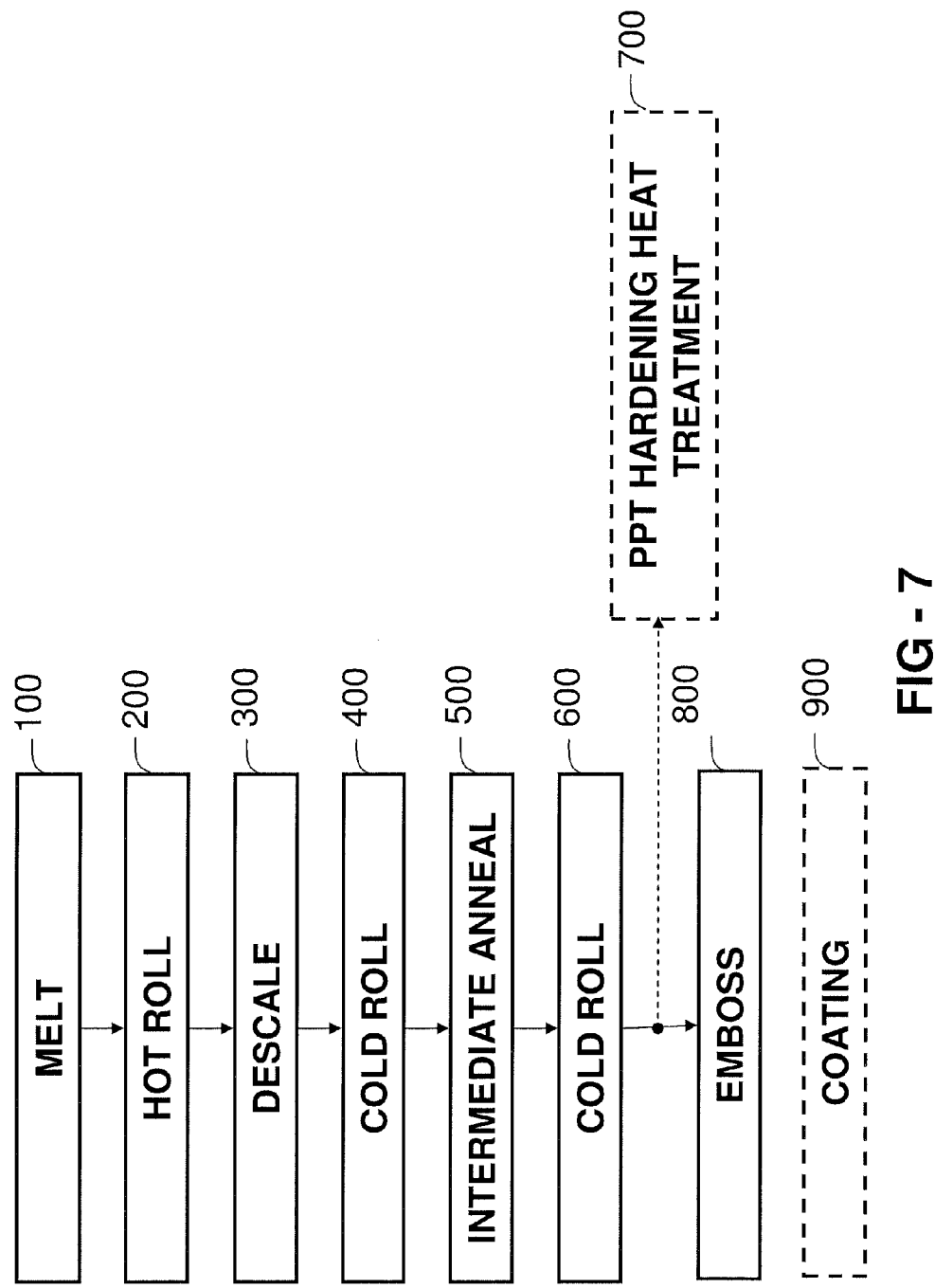
FIG. 7 is a flow chart of the method of the invention.

Referring to FIG. 7, embossed gaskets of the invention may be made by a method including the steps of: forming an annealed sheet of an iron-nickel-chromium alloy; deforming the annealed sheet to form a deformed sheet having a deformed microstructure; and forming a gasket from the deformed sheet having a least one embossed sealing bead; the embossed sealing bead sealably operable with substantially full functional recovery and essentially full retained stress in a fully-clamped, sealed joint at a temperature up to about 1000° F. The method will of course include a step of forming a melt 100 of a suitable iron-nickel-chromium gasket material. The melt of the alloy will then be formed in an intermediate step by solidification into a slab by continuous casting or into a cast billet. The slab or billet will then be formed by a step of hot rolling 200 into one or more continuous rolls of the material. The hot rolled material will generally have a thickness in a range of between about 0.18-0.25 inches. The hot rolled material will then generally be subjected to a step of descaling 300 to remove oxidation and other surface impurities resulting from hot rolling. The descaled material will then generally be subjected to a step of cold rolling 400 to an intermediate thickness so as to avoid over hardening the material and making it too brittle for subsequent gasket processing. This step is generally followed by a step comprising an intermediate anneal 500 to remove a significant portion of the cold work imparted by cold rolling 400. The cold rolling 400 and intermediate anneal 500 are generally repeated at least once to obtain the desired gauge or starting thickness of the gasket sheet material. Once the desired gauge is achieved, the sheet material of the invention is subjected to cold rolling 600 to the desired gasket thickness ,T. It is preferred that the amount of cold rolling 600 to T be about 10-70% reduction of original thickness of the annealed starting material, and more preferable that the amount of cold roll reduction be about 30-40% reduction of the original thickness. Accordingly, the step of deforming may include cold rolling 600 the annealed sheet to produce a cold-rolled microstructure having a degree of deformation that varies as a function of a percentage of cold reduction with the minimum and ranges described herein.

The method of the invention may optionally include a step of providing a precipitation hardening heat treatment 700, such that microstructure which is deformed by cold rolling 600 is also precipitation hardened. The deformed and precipitation hardened microstructure has a hardness which is greater than a hardness of said deformed microstructure for a given alloy. Precipitation hardening heat treatment may be performed at a temperature of between about 1200-1350° F.

The cold rolled iron-nickel-chromium alloy material, or alternately the cold rolled and precipitation hardened alloy material, is then subjected to the step of embossing 800 as described herein to form at least one embossment.

The method of the invention may also optionally include a step of: coating 900 the gasket with a heat resistant gasket coating to produce a coated gasket. The gasket coating (not shown) may include chemically exfoliated vermiculite where at least 90 weight percent of the vermiculite has a thickness of less than or equal to 30 microns and no dimension is greater than 1 millimeter; a high temperature organic resin that is heat resistant to at least 300 degrees Celsius; a supplementary inorganic resin; and a flaky filler, as described in U.S. Pat. No. 7,135,519. Surprisingly, this gasket coating material is also suitable for use over the higher operating temperature range of gaskets 10 of the invention.

The invention provides a sealing-enhancing coating for a gasket or a portion of a gasket, wherein the coating comprises flaky particles of chemically exfoliated vermiculite, at least 90% by weight of said particles having a thickness of no more than 30 microns, and no dimension greater than 1 mm, the particles forming 10 to 90 wt % of the coating, the coating also comprising 50 to 10 wt % of an organic polymer binder which is heat resistant to at least 300° C.

For the present purposes an organic polymer binder is considered to be heat resistant to a particular temperature if, when the binder is formed into a film 1 mm or less in thickness and heated to that temperature in free air for 24 hours, it either does not decompose or decomposes leaving a residue of at least 20% by weight of the film.

A coating of this type improves the sealing ability of embossed gaskets which experience high temperatures in service up to about 1000° F., such as exhaust gaskets for internal combustion engines. Preferably a coating according to the invention has a thickness of less than 100 microns, more preferably less than 80 microns, and most preferably between 50 and 75 microns.

Prior to embossing the sheet material exhibits a distinctive work hardened, cold rolled microstructure with an elongated grain orientation parallel to the cold rolling direction. The seal beads 18, as a result of the additional step of embossing, are further work hardened and may also exhibit additional grain orientation associated with the deformation resulting from the step of embossing the seal bead 18. Depending on the orientation of the embossment with reference to the rolling direction, the microstructure of the seal bead may exhibit additional grain orientation in the rolling direction or may exhibit orientation related to embossing in a direction other than the rolling direction. In any case, seal beads 18 further will exhibit directional grain orientation or other evidence of increased deformation of the material as are well-known in the metallurgical arts as compared to the pre-cold rolled and embossed state of the material. Those materials that have been given a precipitation hardening heat treatment following cold rolling may exhibit less directional grain structure, but nonetheless should evidence a lack of post-embossment heat treating by virtue of evidence of a deformed microstructure associated with the embossed seal beads 18 as compared with the microstructure in other portions of gasket 10.

Once the seal beads 18 are formed, the at least one metal layer 12 is not heat treated or further processed in a manner that would serve to further harden the seal beads 18. In other words, the seal beads 18 derive their final strength and hardness at the time the beads are formed and nothing is done to alter them to strengthen them further once they are formed, including post-embossment heat treating.

One advantage of the invention is that the improvement in recovered gasket height will allow gaskets of the invention to utilize fewer layers to provide the same sealing affect than metal gaskets made from prior art metal gasket materials.

Obviously, many modifications and variations of the present invention are possible in light of the above teachings. It is, therefore, to be understood that within the scope of any ultimately allowed appended claims, the invention may be practiced otherwise than as specifically described.

We claim:

1. A method of making an embossed metal gasket, comprising the steps of:
    cold rolling a sheet of an iron-nickel-chromium alloy to develop a deformed microstructure, a tensile strength of at least 1000 MPa at room temperature, and an elongation of at least 5% at room temperature;
    the iron-nickel-chromium alloy comprising, by weight: 24-55% Ni; 14-21% Cr; 1-3.3% Mo; 0-0.15% Cu; 0-1% Si; 0-2% Mn; 0.65-2.3% Ti; 0-0.8% Al; 0-0.5% V; 0.001-0.01% B; 0-1.0% Co; 4.75-5.5% of the sum of Nb or Ta; 0-0.08% C; 0-0.015% S; 0-0.015% P; and the balance substantially Fe; and
    forming a gasket from the cold rolled sheet, the step of forming the gasket including forming a least one embossed sealing bead.

2. The method of claim 1, wherein said embossed sealing bead is sealably operable with substantially full retained stress in a fully-clamped, sealed joint at an operating temperature up to about 1000° F.

3. The method of claim 1, wherein the deformed microstructure formed during the cold rolling step has a degree of deformation that varies as a function of a percentage of cold reduction.

4. The method of claim 3, wherein said percentage of cold reduction ranges from 10-70%.

5. The method of claim 3, wherein said percentage of cold reduction ranges from 30-40%.

6. The method of claim 1, wherein the elongation in a rolling direction of the sheet developed during the cold rolling step is about 6-25%.

7. The method of claim 6, wherein the elongation in a rolling direction is about 7-10%.

8. The method of claim 1, wherein said iron-nickel-chromium alloy further comprises at least one element selected from the group consisting of V, Al, Co, Nb, Ta and Cu.

9. The method of claim 1, further comprising a step of: providing a precipitation hardening heat treatment after the cold rolling step to develop a deformed and precipitation hardened microstructure, wherein said deformed and precipitation hardened microstructure has a hardness which is greater than a hardness of said deformed microstructure formed during the cold rolling step.

10. The method of claim 1, further comprising a step of: coating said gasket with a heat resistant coating.

11. The method of claim 10, wherein said heat resistant coating comprises:
    chemically exfoliated vermiculite wherein at least 90 weight percent of the vermiculite has a thickness of less than or equal to 30 microns and no dimension is greater than 1 millimeter; a high temperature organic resin that is heat resistant to at least 300 degrees Celsius; a supplementary inorganic resin; and a flaky filler.

12. A method of making an embossed metal gasket, comprising the steps of:
    cold rolling a sheet of an iron-nickel-chromium alloy to develop a deformed microstructure, a tensile strength of at least 1000 MPa at room temperature, and an elongation of at least 5% at room temperature;
    wherein said alloy comprises, by weight: 50.00-55.00% Ni; 17.00-21.00% Cr; 2.80-3.30% Mo; 0-0.15% Cu; 0-0.35% Si; 0-0.35% Mn; 0.65-1.15% i; 0.35-0.80% Al; 0.001-0.006% B; 0-1.00% Co; 4.75-5.5% of the sum of Nb or Ta; 0-0.08% C; 0-0.015% S; 0-0.015% P; and the balance substantially Fe; and
    forming a gasket from the cold rolled sheet, the step of forming the gasket including forming a least one embossed sealing bead.

* * * * *